US008428418B2

(12) United States Patent
Smrha

(10) Patent No.: US 8,428,418 B2
(45) Date of Patent: Apr. 23, 2013

(54) FIBER OPTIC ADAPTER PLATE AND CASSETTE

(75) Inventor: Mark Smrha, West Chicago, IL (US)

(73) Assignee: ADC Telecommunications, Inc., Berwyn, PA (US)

( * ) Notice: Subject to any disclaimer, the term of this patent is extended or adjusted under 35 U.S.C. 154(b) by 546 days.

(21) Appl. No.: 12/592,853

(22) Filed: Dec. 2, 2009

(65) Prior Publication Data

US 2010/0158465 A1 Jun. 24, 2010

Related U.S. Application Data

(60) Provisional application No. 61/201,352, filed on Dec. 9, 2008.

(51) Int. Cl.
*G02B 6/00* (2006.01)
(52) U.S. Cl.
USPC .............................. 385/135; 385/94
(58) Field of Classification Search .................. None
See application file for complete search history.

(56) References Cited

U.S. PATENT DOCUMENTS

| | | | |
|---|---|---|---|
| 5,212,761 A | 5/1993 | Petrunia | |
| 5,274,729 A | 12/1993 | King et al. | |
| 5,363,465 A | 11/1994 | Korkowski et al. | |
| 5,432,875 A | 7/1995 | Korkowski et al. | |
| 5,708,742 A | 1/1998 | Beun et al. | |
| 5,975,769 A | 11/1999 | Larson et al. | |
| 6,208,796 B1 | 3/2001 | Vigliaturo | |
| D448,005 S | 9/2001 | Klein, Jr. et al. | |
| 6,474,876 B1 | 11/2002 | Sikorski, Jr. | |
| 6,556,763 B1 | 4/2003 | Puetz et al. | |
| 6,760,531 B1 | 7/2004 | Solheid et al. | |
| 6,850,685 B2 | 2/2005 | Tinucci et al. | |
| 6,863,446 B2 | 3/2005 | Ngo | |
| 6,916,199 B2 | 7/2005 | Follingstad | |
| 6,920,274 B2 | 7/2005 | Rapp et al. | |
| 7,059,779 B2 | 6/2006 | Khor | |
| 7,116,777 B2 | 10/2006 | Knudsen et al. | |

(Continued)

FOREIGN PATENT DOCUMENTS

GB 2 166 262 A 4/1986
WO WO 2008/089192 A1 7/2008

OTHER PUBLICATIONS

TrueNet® Structured Cabling; Fiber Connectivity Solutions; RMG Series Fiber Enclosures; Mar. 2006; p. 278.
TrueNet® Structured Cabling; Fiber Connectivity Solutions; RMG Series Fiber Enclosures; Mar. 2006; p. 271.

(Continued)

*Primary Examiner* — Jerry Rahll
(74) *Attorney, Agent, or Firm* — Merchant & Gould P.C.

(57) ABSTRACT

An adapter cassette including a housing and an adapter plate that mounts to a front opening of the housing by a snap-fit connection. The adapter cassette also including a cover that mounts to the housing by a snap-fit connection to enclose cable terminations within an interior of the housing. The adapter plate of the adapter cassette can further be mounted directly to a telecommunications panel without the housing for use in applications having non-enclosed cable terminations.

30 Claims, 11 Drawing Sheets

U.S. PATENT DOCUMENTS

| | | |
|---|---|---|
| 7,346,254 B2 | 3/2008 | Kramer et al. |
| 7,357,667 B2 | 4/2008 | Clark et al. |
| 7,418,181 B2 | 8/2008 | Zimmel et al. |
| 7,493,002 B2 | 2/2009 | Coburn et al. |
| 2002/0181896 A1 | 12/2002 | McClellan et al. |
| 2003/0108320 A1 | 6/2003 | Letourneau et al. |
| 2005/0111809 A1 | 5/2005 | Giraud et al. |
| 2006/0093301 A1 | 5/2006 | Zimmel et al. |
| 2006/0093304 A1 | 5/2006 | Battey et al. |
| 2008/0175550 A1 | 7/2008 | Coburn et al. |

OTHER PUBLICATIONS

ADC Telecommunications, Filter Management Tray, 8 pgs., Mar. 2003.

ADC Telecommunications, OmniReach™ FTTX Solutions, 12 pgs., Jul. 2006.

Office Action from U.S. Appl. No. 12/371,737 dated Dec. 9, 2009; 8 pages.

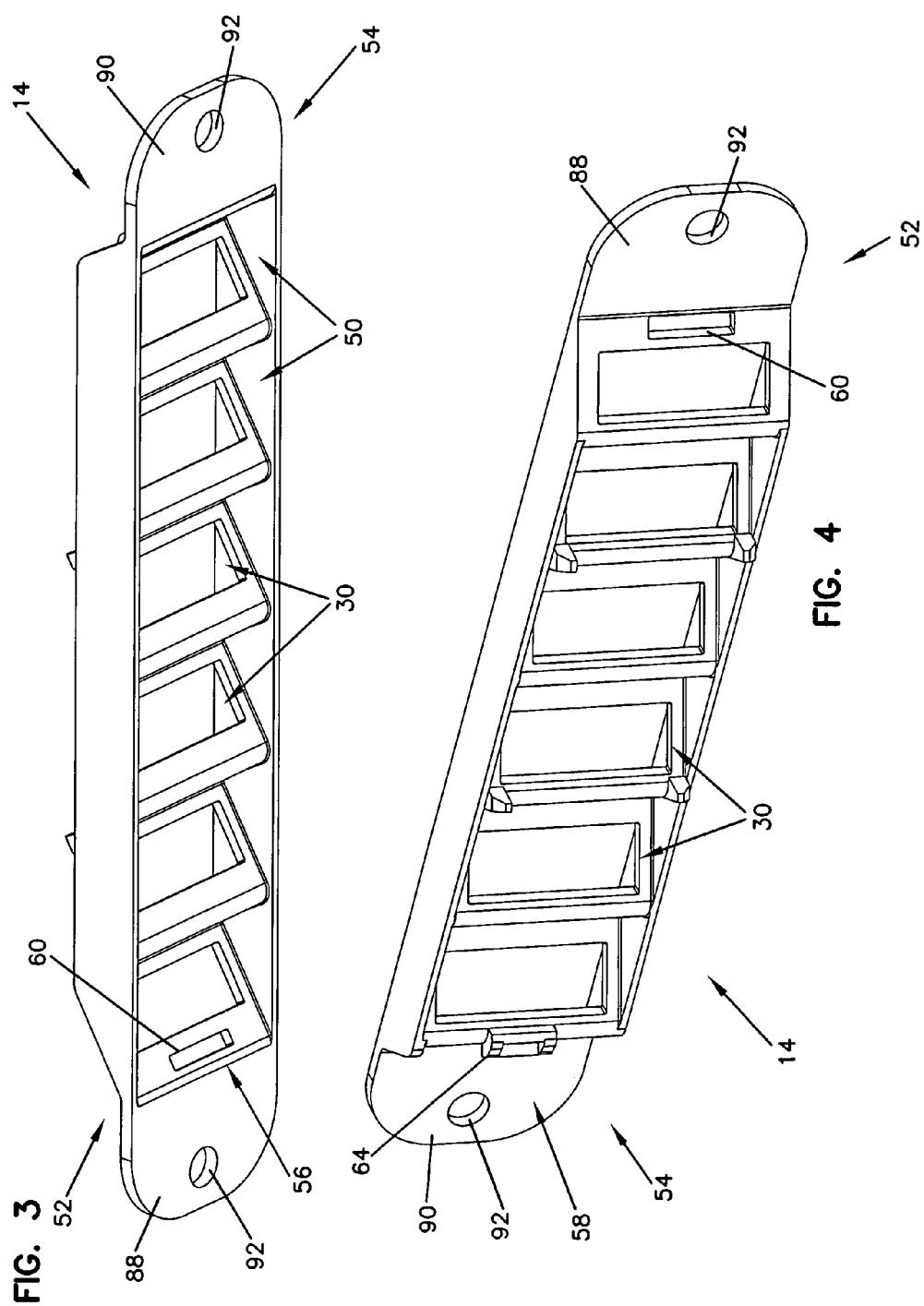

FIBER OPTIC ADAPTER PLATE AND CASSETTE

CROSS-REFERENCE TO RELATED APPLICATIONS

This application claims the benefit of U.S. Provisional Application Ser. No. 61/201,352, filed Dec. 9, 2008; which application is incorporated herein by reference.

TECHNICAL FIELD

This disclosure relates to devices for use in the telecommunications industry. More specifically, this disclosure relates to termination devices for use with fiber optic cables.

BACKGROUND

Many local area networks and telecommunication systems utilize termination panels to provide cross-connection between telecommunications equipment. Termination panels typically include front and rear connections. In some applications, the front and rear connections are provided by adapter devices, such as adapter modules, that mount to the termination panels. Improvements are needed with regards to such adapter devices, for example, with regards to the manufacture and assembly of adapter devices, and with regards to the ability to utilization adapter devices in different termination applications.

SUMMARY

One aspect of the present disclosure relates to an adapter cassette including a housing, a cover, and a front adapter plate that mounts within the front opening of the housing. Each of the cover and the front adapter plate attaches to the housing by a snap-fit connection. Another aspect of the present disclosure relates to the front adapter plate being configured for use in a termination panel application with or without attachment of the housing; this feature providing the user with the option of enclosed cable terminations or non-enclosed cable terminations.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 3 is a top, front perspective view of a front adapter plate of the adapter cassette of FIG. 1, shown in isolation;

FIG. 4 is a rear perspective view of the front adapter plate of FIG. 3;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
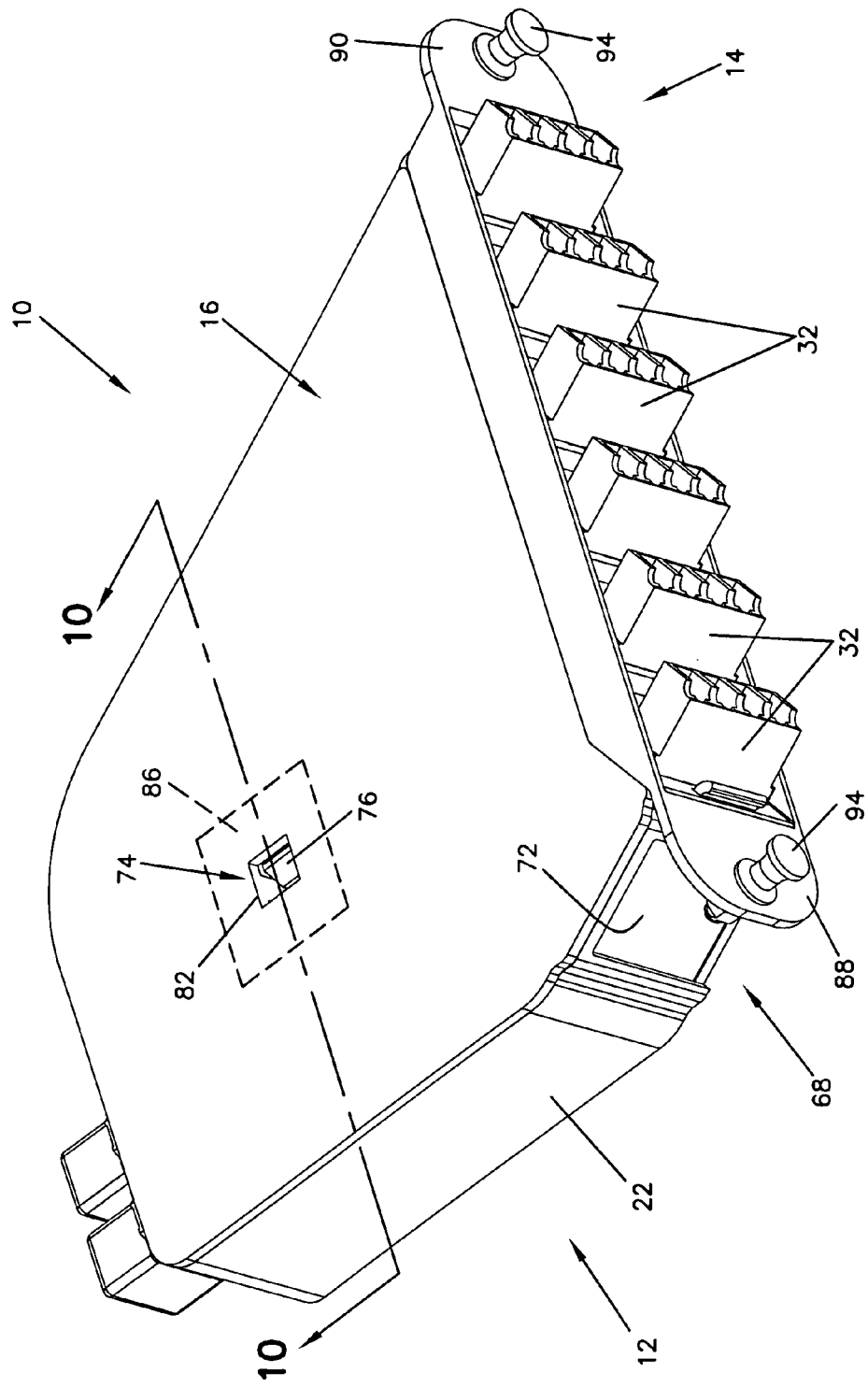
FIG. 1 is a top perspective view of one embodiment of an adapter cassette, in accordance with the principles disclosed.

FIG. 1 illustrates one embodiment of an adapter module or cassette 10 in accordance with the principles disclosed. The adapter cassette 10 generally includes a housing 12, a front adapter plate 14, and a cover 16, all of which can be assembled to one another without the use of a tool. In one embodiment, each of these components (i.e., the housing 12, the front adapter plate 14, and the cover 16) are made of plastic. The plastic construction reduces costs associated with the manufacture of the adapter cassette and facilitates the tool-free assembly of the cassette.

The construction of the front adapter plate 14 of the present cassette 10 is also versatile in that the plate 14 can be utilized separately from the housing 12 and the cover 16. In particular and as will be described in greater detail hereinafter, the front adapter plate 14 can be selectively utilized with the housing and cover in applications where enclosed cable terminations are desired, and can be selectively utilized without the housing and cover in applications where non-enclosed cable terminations are desired.

Figure 2:
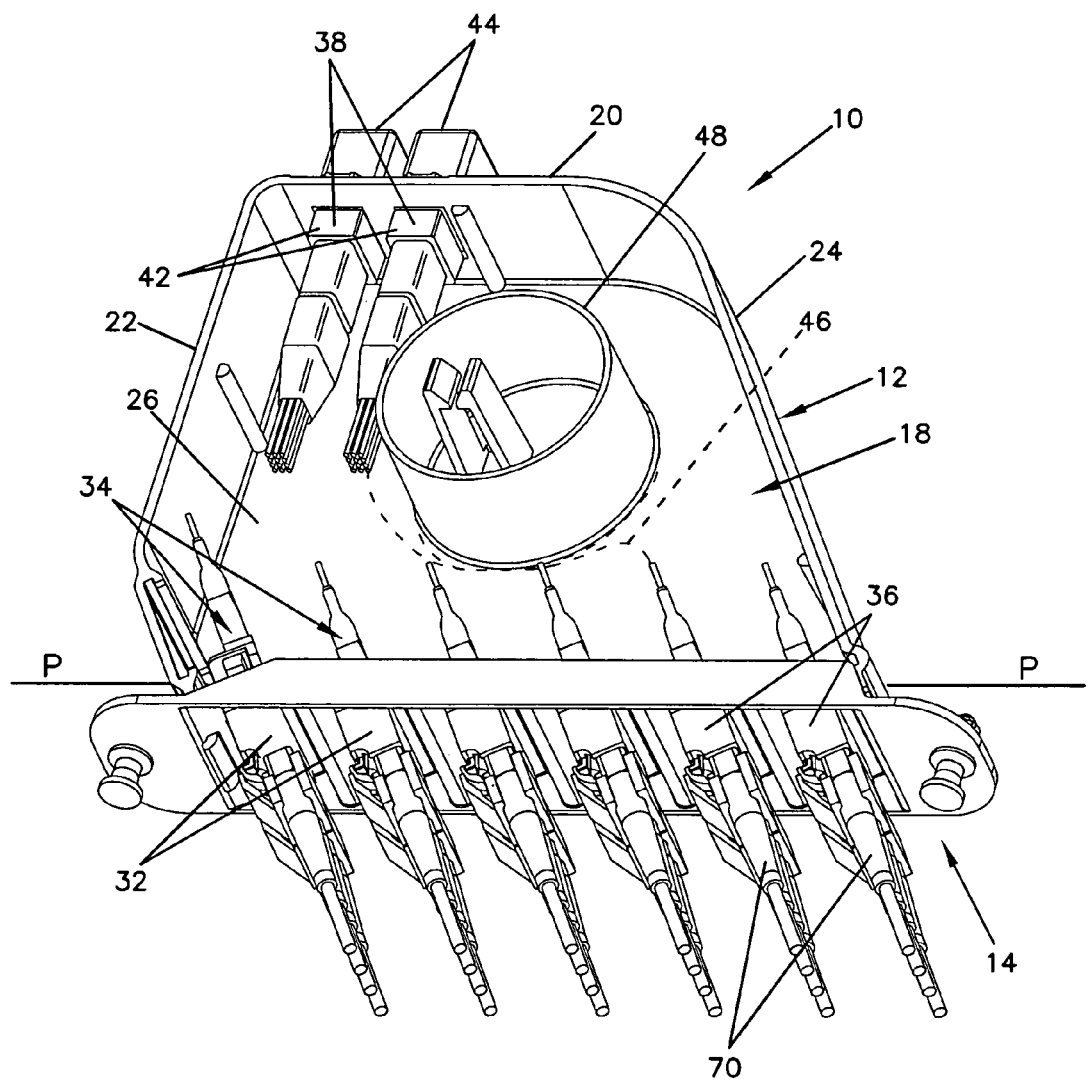
FIG. 2 is a top perspective view of the adapter cassette of FIG. 1, illustrating the interior of the cassette, and shown with connectors connected to adapters of the cassette.
Figure 5:
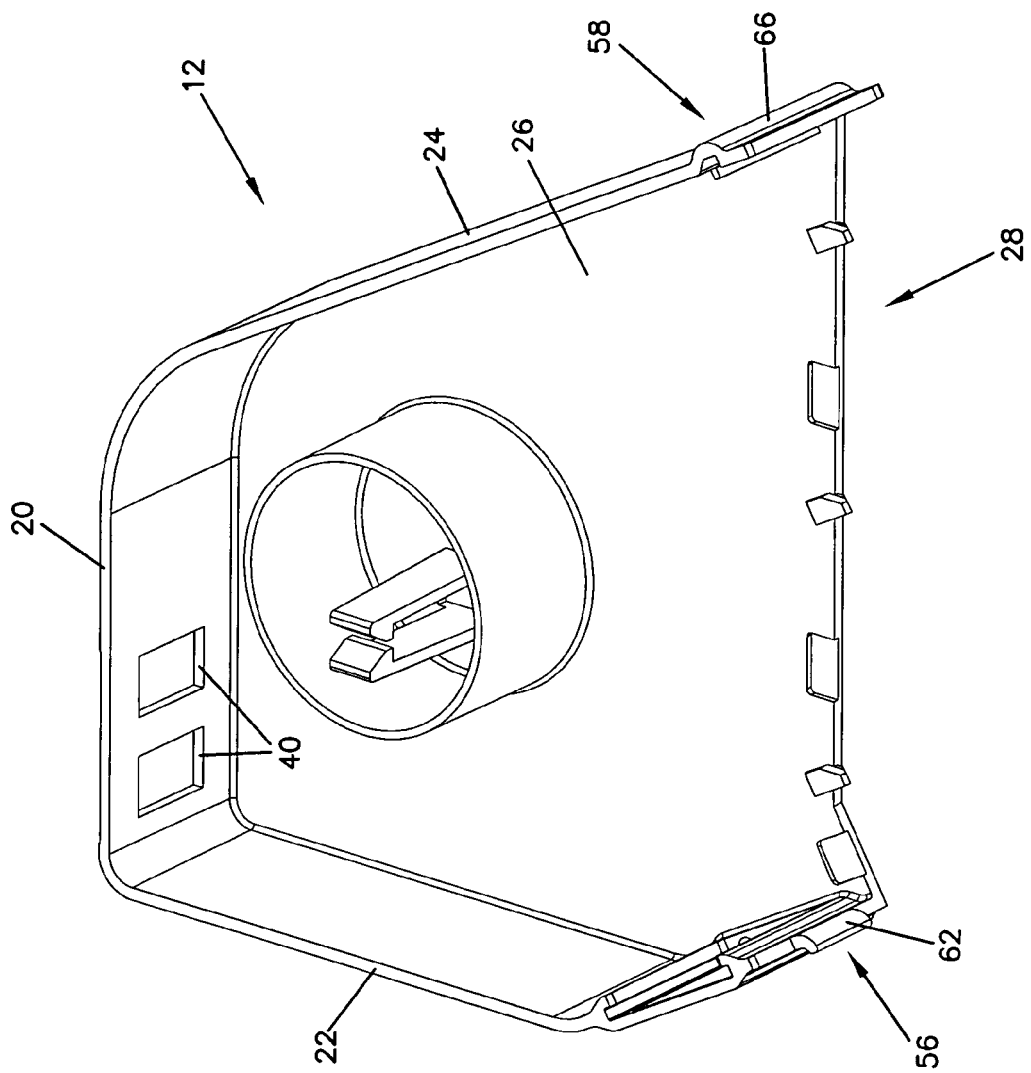
FIG. 5 is a top perspective view of a housing of the adapter cassette of FIG. 1, shown in isolation.

Referring to FIGS. 1 and 2, the housing 12 of the present adapter cassette 10 is a generally wedge-shaped housing defined by a number of housing walls. The number of housing walls includes, for example, a rear wall 20, first and second side walls 22, 24, and a bottom wall 26. While reference is made with respect to rear, side, and bottom walls, the particular orientation of the cassette described by referring to a wall as a "bottom" wall, for example, is made only for purposes of describing the particular orientation illustrated. As can be understood, in other applications, the bottom wall of the housing can define the top, side, rear or front of the housing, depending upon the mounting orientation of the cassette. The housing 12 further has a front opening 28 (FIG. 5). The front adapter plate 14 is located within and attaches to the housing 12 at the front opening 28.

Referring now to FIGS. 3 and 4, the front adapter plate 14 defines an array of adapter openings 30. Fiber optic adapters 32 (FIG. 1) are mounted within the openings 30 of the front adapter plate 14. In the illustrated embodiment, the front adapter plate 14 has a corrugated construction that defines a number of angled notches 50. The openings 30 are located in the angled notches 50 of the front adapter plate 14.

The fiber optic adapters 32 received within the openings 30 of the front adapter plate 14 can include, for example, LC type adapters (shown in FIGS. 2 and 8), SC type adapters, ST type adapters; or FC type adapters. Other types of adapters or mating connectors can be used in accordance with the principles disclosed. For example, in some applications, copper cables may be used coextensively with or exclusively from fiber optic cables; and accordingly various types of wire terminations or wire connectors can be provided by the front adapter plate. In other words, the cassette can be adapted for use in copper applications, applications having hybrid cabling, or applications having both types of fiber optic and copper cabling, in accordance with the principles disclosed.

Figure 8:
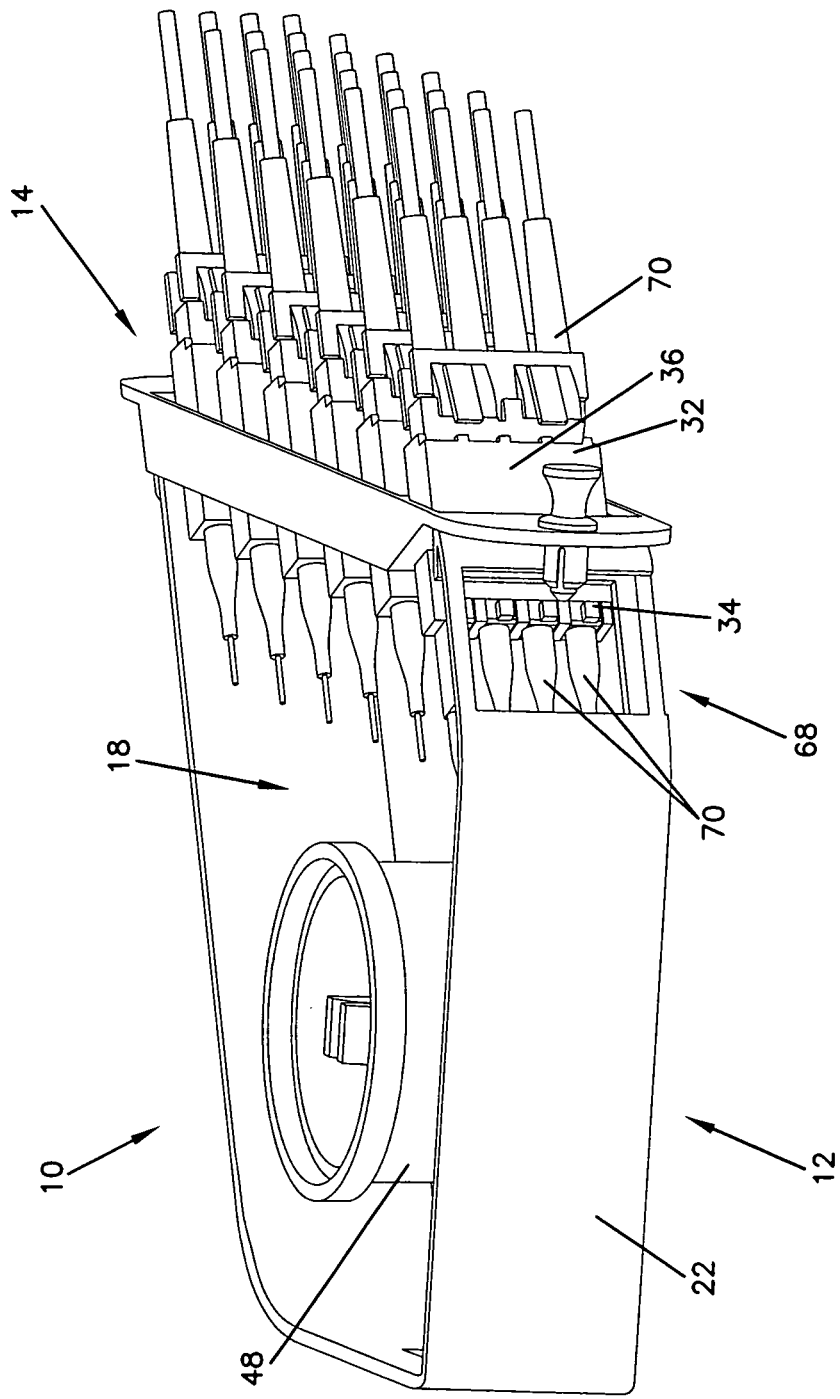
FIG. 8 is a side perspective view of the adapter cassette of FIG. 2.

As shown in FIGS. 2 and 8, each of the fiber optic adapters 32 has one or more connector receiving locations for receiving fiber optic cable connectors (e.g., 70). Each of the adapters 32 of the cassette 10 is mounted within the openings 30 (FIG. 3) of the front adapter plate 14 such that at least one rearward or interior connection end 34 (FIG. 8) of the adapter 32 is located within the interior 18 of the housing 12; and such that at least one exterior connection end 36 of the adapter 32 is located outside of the housing. The openings 30 of the front adapter plate 14 are further arranged such that the exterior connection ends 36 of the adapters 32 are angled (FIG. 2) in a direction toward the second side wall 24 of the housing. In the alternative, the adapters can be angled in a direction toward the first side wall 22 of the housing. In general, the adapters 32 are angled in a non-perpendicular direction relative to a plane P-P (FIG. 2) defined by the front opening 28 (FIG. 5) of the housing 12. As will be described in greater detail hereinafter, the adapters 32 are angled to provide a directional cabling exit away from the cassette 10.

Referring now to FIGS. 2 and 5, two multi-fiber cable adapters 38 are mounted on the rear wall 20 of the housing 12 opposite the front opening 28. In the illustrated embodiment, the cable adapters 38 are mounted within apertures 40 provided in the rear wall 20. The apertures 40 may be provided in the form of knock-outs (i.e., portions of the housing that can be punched out) so that a user can create in the housing only the number of apertures needed. Each aperture 40 receives one of the multi-fiber cable adapters 38. The multi-fiber cable adapters 38 can include, for example, MPO adapters. In alternative embodiments only one adapter or more than two adapters may be provided; also other types of adapters or mating connectors can be used as well.

Further, in the present embodiment, each of the cable adapters 38 is configured to connect to a cable having multiple optical fibers, for example, six optical fibers. Similar to the adapters 32 of the front adapter plate 14, the multi-fiber cable adapters 38 have an interior connection end 42 located within the interior 18 of the housing 12, and an exterior connection end 44 (shown with a dust cap) located outside of the housing. Optical cable connections 46 (schematically represented in FIG. 2) provide interconnections between the interior connection ends 42 of the multi-fiber cable adapters 38 and the interior connection ends 34 of the fiber optic adapters 32. In the illustrated housing 12, an integral radius limiter 48 is formed on the bottom wall 26 to organize the cable connections 46 and prevent the cable connections from exceeding a minimum bend radius.

Referring now to FIGS. 3-6, the front adapter plate 14 has a first end 52 and a second end 54. The first end 52 of the front adapter plate 14 is attached to the housing 12 by a hinged connection 56. The second end 54 of the front adapter plate 14 is attached to the housing 12 by a snap-fit connection 58. Each of the hinged connection 56 and the snap-fit connection 58 is tool-less such that the front adapter plate 14 secures to the front opening 28 of the housing 12 without the use of a tool.

The hinged connection 56 of the adapter cassette 10 generally includes a slot or opening 60 (FIGS. 3 and 6) formed in the front adapter plate 14 that receives a tab 62 (FIGS. 5 and 6) provided on the housing 12. In the alternative, the opening could be formed in the housing and the tab provided on the front adapter plate. The snap-fit connection 58 of the adapter cassette 10 generally includes a projection 64 (FIG. 4) provided on the front adapter plate 14 and a recess or notch 66 (FIGS. 5 and 6) formed in the housing 12. In the alternative, the projection could be provided on the housing and the notch formed in the front adapter plate.

Figure 6:
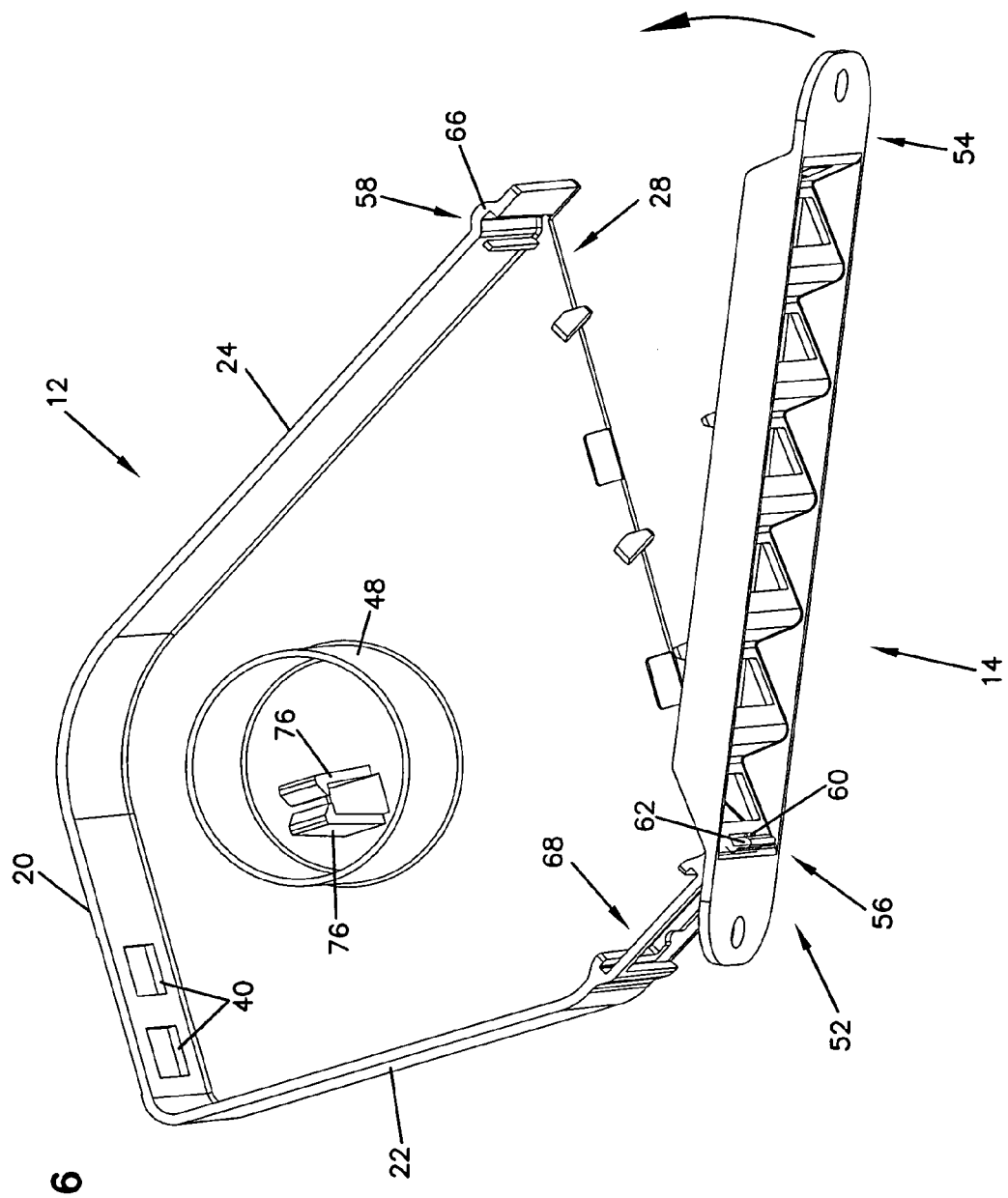
FIG. 6 is a top perspective view of the front adapter plate of FIG. 3 partly attached to the housing of FIG. 5.

During assembly of the adapter cassette 10, the first end 52 of the adapter plate 14 is connected to the housing 12 by positioning the tab 62 within the opening 60. The front adapter plate 14 is then pivoted about this hinged connection 56 to close the front opening 28, as illustrated in FIG. 6. The second end 54 of the front adapter plate 14 is then snap-fit to the housing 12 by the snap-fit connection 58.

Figure 7:
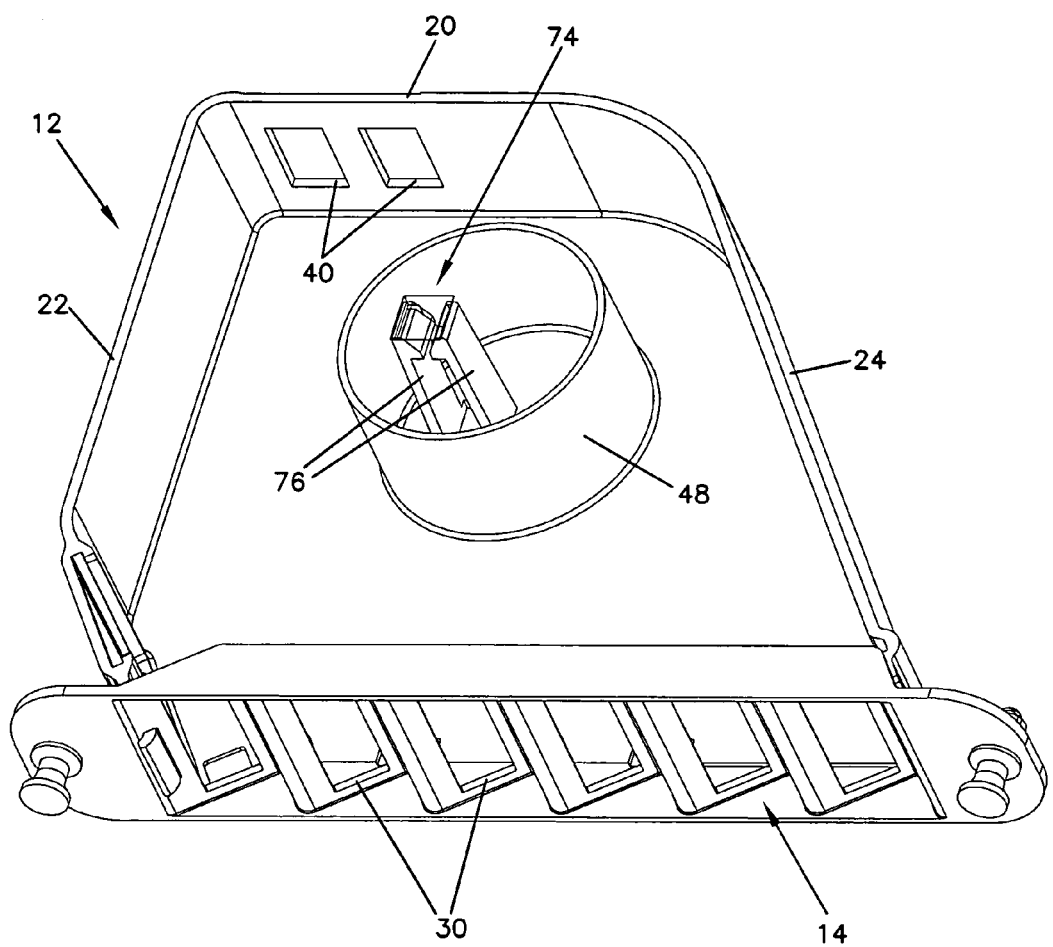
FIG. 7 is a top perspective view of the front adapter plate and housing of FIG. 6, attached to one another.

Referring to FIGS. 7 and 8, the adapters 32 can be loaded or mounted within the openings 30 of the front adapter plate 14 either before the plate 14 is attached to the housing 12 or after. The openings 30 (FIG. 7) of the front adapter plate 14 are sized and arranged so that the adapters 32 snap-fit to the front adapter plate without the use of a tool. Likewise, the apertures 40 at the rear of the housing 12 are sized and arranged so that the multi-fiber cable adapters 38 (FIG. 2) snap-fit to the housing 12 without the use of a tool.

Referring now to FIGS. 1 and 8, an access opening 68 is formed in the housing 12 adjacent to the front opening 28 (see also FIG. 6). Because of the angled orientation of the adapters 32, access to the interior connection ends 34 of the adapters 32 located adjacent to the first side wall 22 is limited (see top perspective view in FIG. 2). Likewise, access to cable connectors 70 mounted to the adapters located adjacent to the first side wall 22 is limited. The opening 68 of the housing provides finger access to those particular interior connection ends 34 and/or cable connectors 70. Referring to FIG. 1, the adapter cassette 10 can includes an insert piece 72 that prevents contaminants, such as dust, from entering the interior 18 of the housing 12 through the access opening 68. The insert piece 72 is removable to provide the finger access to the particular interior connection ends 34 and/or cable connectors 70 when needed.

Referring back to FIG. 1, the cover 16 of the adapter cassette 10 encloses the interior 18 of the housing 12 to protect the optical cable connections 46 (FIG. 2) and the interior connection ends 34, 42 of the adapters 32, 38. The cover 16 is attached to the housing by a snap-fit connection 74.

Figure 9:
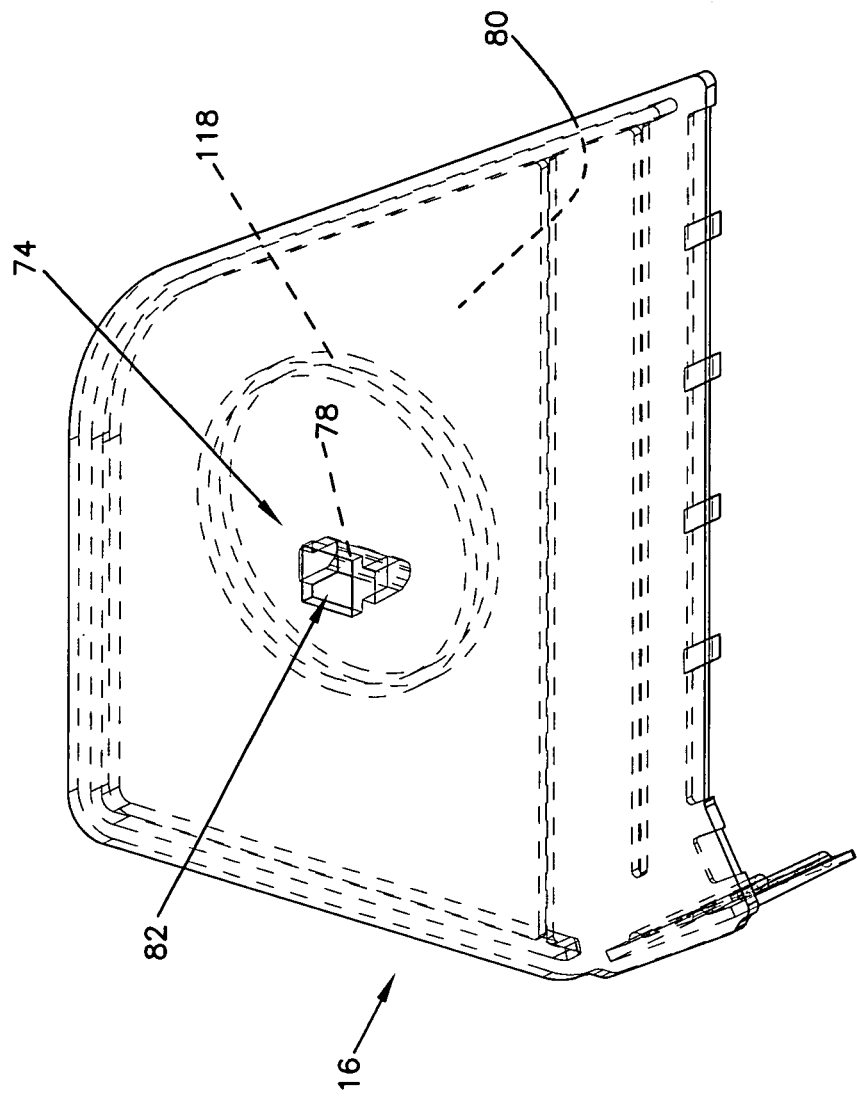
FIG. 9 is a top perspective view of the cover of the adapter cassette of FIG. 1.
Figure 10:
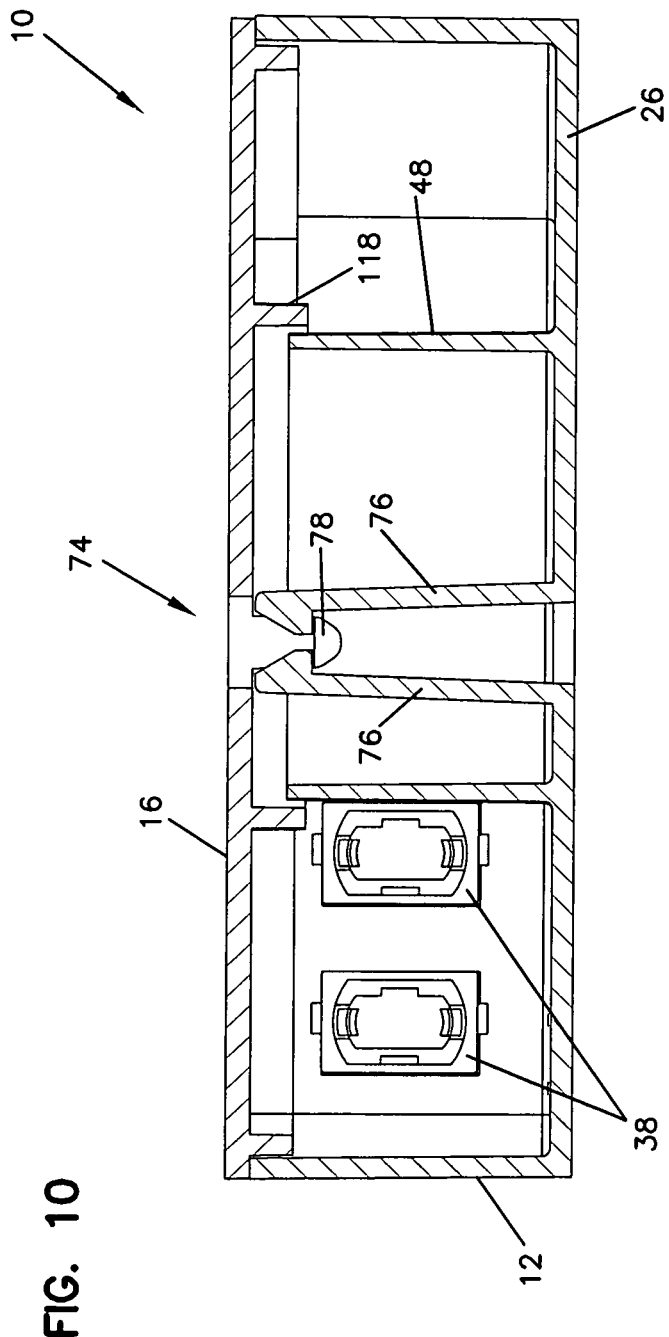
FIG. 10 is a cross-sectional view of the adapter cassette of FIG. 1, taken along line 10-10, illustrating the cover of the adapter cassette engaged with the housing of the adapter cassette.

The snap-fit connection 74 between the cover 16 and the housing 12 generally includes a pair of flexible arms 76 (FIGS. 7 and 10) that projects outward from the bottom wall 26 of the housing 12, and a tab 78 (FIG. 9) that projects outward from a first interior side 80 of the cover 16. In the illustrated embodiment, the flexible arms 76 are located within the perimeter of the radius limiter 48 so as not to obstruct the curved routing of the optical cable connections 46 (FIG. 2) within the interior 18 of the housing 12. The tab 78 of the cover engages with the flexible arms 76 when the cover 16 is pressed toward the bottom wall 26 to provide the snap-fit connection 74 between the cover 16 and the housing 12. In the alternative, flexible arms can be provided on the cover and a tab can be provided in the housing. The snap-fit connection 74 of the present adapter cassette 10 permits assembly of the cover 16 to the housing 12 without the use of a tool.

Referring back to FIG. 1, the cover 16 defines a top opening 82 that provides access to the snap-fit connection 74 for removal of the cover 16 when access to the housing interior 18 is needed. When access to the interior is needed, a tool can be inserted within the top opening 82 of the cover 16 to flex one of the two flexible arms 76 out of engagement with the tab 78 of the cover. With one of the two flexible arms 76 so disengaged, the cover 16 can be removed.

In some applications, it is desirable to know whether or not the interior 18 of the housing 12 has been accessed. Still referring to FIG. 1, in such applications, an access-evident device 86 may be placed over the top-opening 82 to provide evidence of access. The access-evident device 86 may include, for example, a label that is broken when a tool is inserted into the top-opening 82 to remove the cover 16 and access the interior 18, as previously described.

Referring again to FIG. 9, in the illustrated embodiment, the cover 16 includes a circular member 118 formed on the interior side 80 of the cover. The circular member 118 corresponds to the circular configuration of the radius limiter 48 to create a labyrinth type structure (see FIG. 10) that prevents the optical cable connections 46 from inadvertently becoming displaced or pinched between the radius limiter 48 and the cover 16.

Referring back to FIGS. 1, 3 and 4, the front adapter plate 14 of the adapter cassette 10 further includes first and second mounting flanges 88, 90 located at each of the first and second ends 52, 54 of the adapter plate. Each mounting flange defines a hole 92 sized to receive a fastener 94, such as a push pin fastener. The mounting flanges 88, 90 and the fasteners mount the adapter cassette 10 to framework structure of a telecommunications system.

Figure 11:
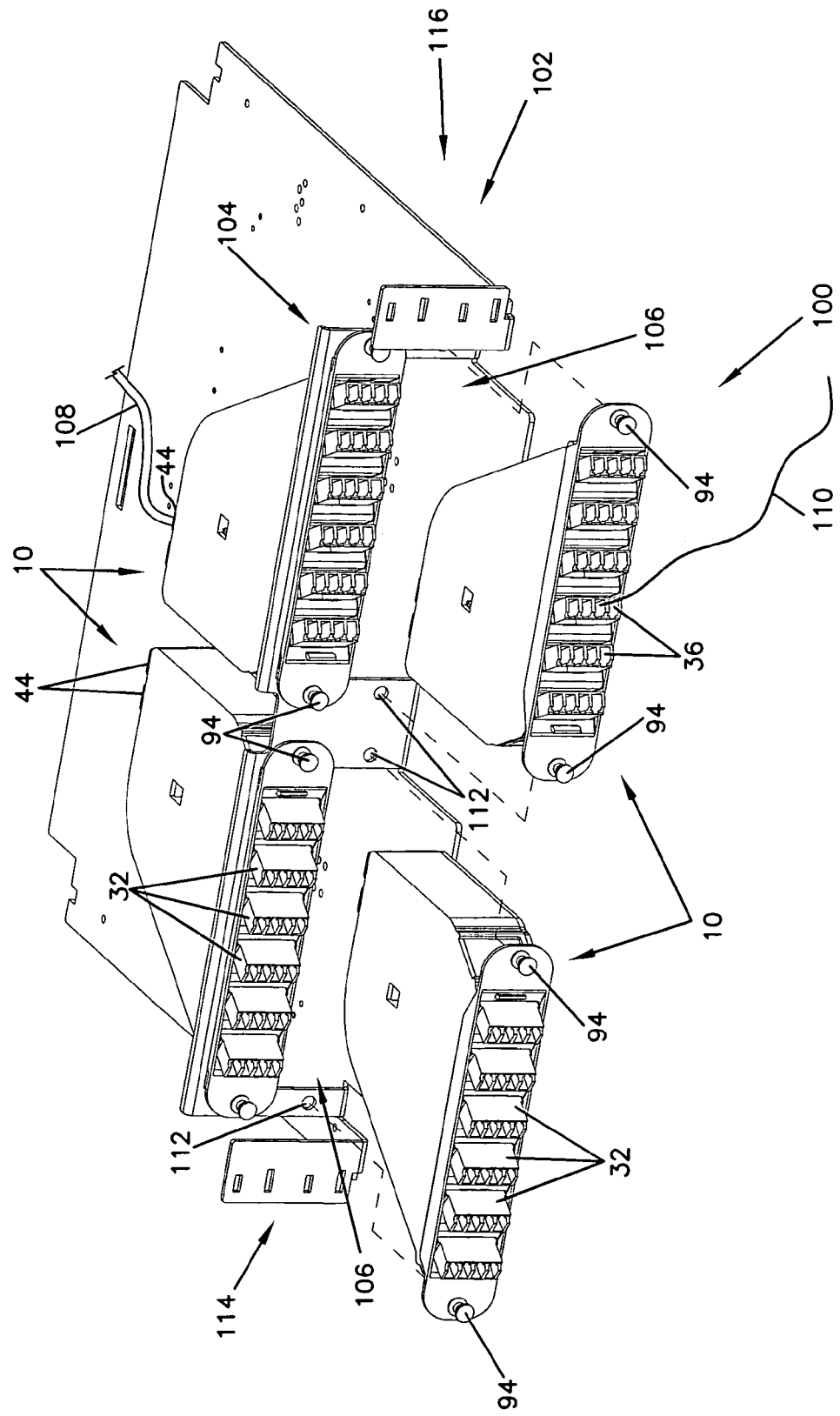
FIG. 11 is a front elevation view of a telecommunications panel illustrating the adapter cassette of FIG. 1 mounted to the panel.

FIG. 11 illustrates one embodiment of telecommunications system 100 including a termination panel 102 having a framework structure 104 to which the present adapter cassette 10 may be mounted. The framework structure 104 defines one or more apertures 106 sized to receive adapter cassettes 10. The framework structure 104 also defines mounting holes 112 that receive the fasteners 94 for securing the adapter cassettes 10 relative to the panel 102. In the illustrated termination panel 102, four adapter cassettes 10 are mounted to the framework structure 104 of the panel.

In the application of FIG. 11, cables 108 (only one schematic representation shown) are terminated to the exterior connection end 44 of the multi-fiber cable adapters 38 (FIG. 2) of the cassettes 10. As previously described, optical cable connections (e.g., 46 shown in FIG. 2) connect the rear multi-fiber cable adapters 38 to the front adapters 32 of the cassettes 10. Jumper cables or patching cables 110 (only one schematic representation shown) can be connected to the exterior connection ends 36 of the front adapters 32 to provide connections between the termination panel 102 and other equipment of the system 100.

In this panel 102, the cassettes 10 are arranged such that the accessible exterior connection ends 36 of the adapters 32 angle toward the sides 114, 116 of the panel 102. This accommodates a sideward routing flow of the patching cables 110 such that the patching cables are more effectively routed to areas adjacent the termination panel 102 where cable routing guides and cable channels are often provided. The present adapter cassette 10 can also be used in other panel arrangements, frames, or devices, including devices that mount to overhead cable pathways.

As previously described, the front adapter plate 14 of the adapter cassette 10 secures to the front opening 28 of the housing 12, and further includes the mounting flanges 88, 90 which secure the adapter cassette 10 to the framework structure (e.g., 104) of a telecommunications system. The front adapter plate 14 of the adapter cassette is also constructed to secure only to the framework structure (e.g. 104). That is, the front adapter plate 14 of the present disclosure is configured for use in a termination application without the housing 12 (and without the cover 16 that attaches to the housing). This feature provides the user with the option of having enclosed cable terminations or non-enclosed cable terminations.

For example, in the termination panel application of FIG. 11 (e.g., system 100), the rearward connection ends of the fiber optic adapters 32 are enclosed by the housing 12 (and cover 16) when the cassette 10 is mounted within one of the apertures 106 of the framework structure 104. In the alternative, only the front adapter plate 14 can be mounted within the aperture 106 of the framework structure 104 such that the rearward connection ends 34 of the fiber optic adapters 32 are unenclosed. The ability to selectively utilize the front adapter plate 14 with or without the housing permits a user to customize a system to better meet the needs of the system.

Figure 12:
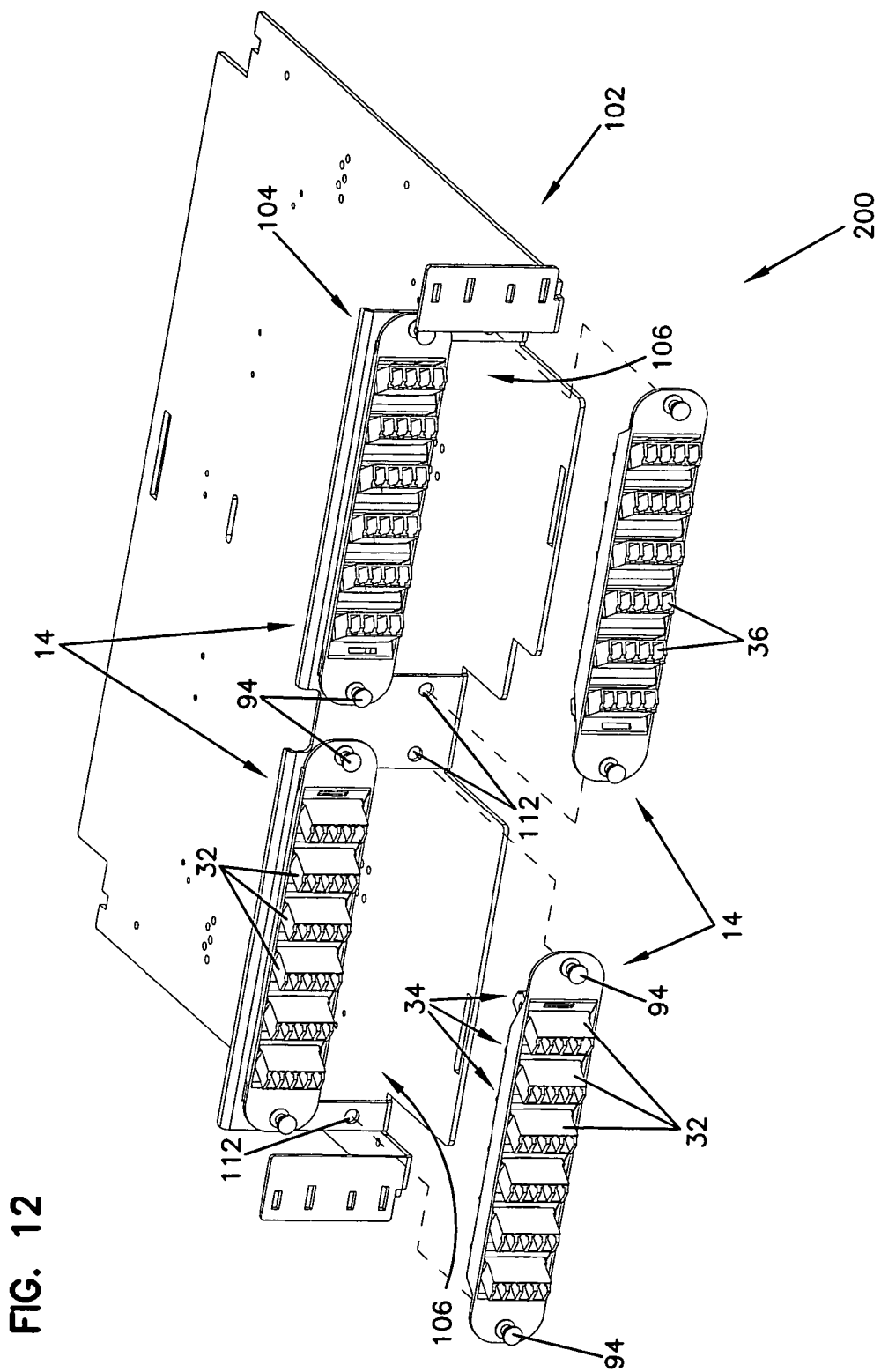
FIG. 12 is a front elevation view of a telecommunications panel illustrating only the front adapter plate of the adapter cassette of FIG. 1 mounted to the panel.

Referring now to FIG. 12, one such telecommunications system 200 that utilizes only the front adapter plate 14 of the cassette is illustrated. In this embodiment, the system 200 includes the termination panel 102 and the framework structure 104 previously described. In this system 200, only the adapter plates 14 of the cassettes are mounted within the apertures 106 of the framework structure 104 (i.e., by way of the fasteners 94 being received within the mounting holes 112 of the framework structure).

In the application of FIG. 12, the rearward connection ends 34 of the fiber optic adapters 32 are non-enclosed connection ends; what is meant by "non-enclosed" is that the rearward connection ends 34 are provided in an open region within the termination panel 102, as opposed to being enclosed within a housing or module; the housing or module in turn being mounted within the termination panel 102. While the rear connection ends 34 of the adapters 32 may be enclosed by the termination panel 102, the rear connection ends 34 of one adapter plate 14 mounted to the termination panel 102 are not enclosed separately from the rear connection ends 34 of another adapter plate 14 mounted to the termination panel 102.

In the application of FIG. 12, cables are terminated to the rear connection ends 34 of the adapters of the adapter plates 14. Jumper cables or patching cables are connected to the front connection ends 36 of the adapters 32 to provide connections between the termination panel 102 and other equipment of the system 200.

The above specification provides a complete description of the present invention. Since many embodiments of the invention can be made without departing from the spirit and scope of the invention, certain aspects of the invention reside in the claims hereinafter appended.

What is claimed is:

1. A fiber optic adapter cassette, comprising:
   a) a housing defining an interior, the housing including:
      i) a front opening;
      ii) a rear wall opposite the front opening, the rear wall defining an aperture;
   b) a removable front adapter plate defining an array of adapter openings, the removable front adapter plate being attached to the front opening of the housing by a snap-fit connection;
   c) a plurality of fiber optic adapters mounted within the openings of the front adapter plate, each of the adapters defining an exterior connection end and an interior connection end;

d) a multi-fiber cable adapter mounted within the aperture of the rear wall of the housing, the multi-fiber cable adapter defining an exterior connection end and an interior connection end;

e) a plurality of optical cable connections located within the interior of the housing, each optical cable connection being terminated to the internal connection end of the multi-fiber cable adapter and the internal connection end of one of the fiber optic adapters; and f) a cover defining a top opening for providing access to the housing interior, the cover attached to the housing by a snap-fit connection, the cover enclosing the optical cable connection within the interior of the housing, wherein the housing and the cover are made of a plastic material.

2. The cassette of claim 1, wherein the exterior connection ends of the adapters are angled in a non-perpendicular direction relative to a plane defined by the front opening of the housing.

3. The cassette of claim 2, wherein the front adapter plate defines a number of angled notches, the openings being located in the angled notches.

4. The cassette of claim 1, wherein the plurality of fiber optic adapters includes one of LC type adapters and SC type adapters.

5. The cassette of claim 1, wherein the front adapter plate includes mounting flanges each defining a hole, the cassette further including mounting fasteners received within the holes of the mounting flanges to mount the cassette to framework structure of a telecommunications system.

6. The cassette of claim 1, wherein the front adapter plate is further attached to the front opening of the housing by a hinged connection.

7. The cassette of claim 6, wherein a first end of the front adapter plate is first attached to the housing by the hinged connection, and a second end of the front adapter plate is then attached to the housing by the snap-fit connection.

8. The cassette of claim 7, wherein the hinged connection includes an opening formed in the front adapter plate that receives a tab provided on the housing, and wherein the snap-fit connection includes a notch formed in the housing that receives a projection provided on the front adapter plate.

9. The cassette of claim 1, wherein an access opening is formed in the housing adjacent to the front opening to provide finger access to the interior connection ends of fiber optic adapters mounted at an end of the array of adapter openings.

10. The cassette of claim 9, further including an insert piece positioned within the access opening that prevent contaminants from entering the interior of the enclosed housing, the insert piece being removable to provide the finger access to the interior connection end of the fiber optic adapters when access is needed.

11. The cassette of claim 1, wherein the snap-fit connection between the cover and the housing includes a flexible arm that projects outward from a wall of the housing opposite the cover, and a tab that projects outward from a first side of the cover, the tab engaging with the flexible arm to provide the snap-fit connection between the cover and the housing.

12. The cassette of claim 11, wherein the cover includes a top opening accessible from a second side of the cover opposite the first side, the top opening providing access to the snap-fit connection to remove the cover from the housing.

13. The cassette of claim 12, further including an access-evident device placed over the top opening that provides evidence of access to the interior of the housing by removal of the cover.

14. The cassette of claim 1, further including an access-evident device that provides evidence of access to the interior of the housing by removal of the cover.

15. A fiber optic adapter cassette, comprising:

a) a housing defining an interior, the housing having a front opening, an access opening adjacent to the front opening, and a rear aperture;

b) a removable front adapter plate defining an array of adapter openings, the removable front adapter plate being attached to the front opening of the housing by a hinged connection and a snap-fit connection;

c) a plurality of fiber optic adapters mounted within the openings of the front adapter plate, each of the adapters defining an exterior connection end and an interior connection end, each of the adapters being angled at a non-perpendicular angle relative to the front opening of the housing, the interior connection ends of fiber optic adapters mounted at an end of the array of adapter openings of the front adapter plate being accessible through the access opening of the housing;

d) a multi-fiber cable adapter mounted within the aperture of the rear wall of the housing, the multi-fiber cable adapter defining an exterior connection end and an interior connection end;

e) a plurality of optical cable connections located within the interior of the housing, each optical cable connection being terminated to the internal connection end of the multi-fiber cable adapter and the internal connection end of one of the fiber optic adapters; and f) a cover defining a top opening for providing access to the housing interior, the cover attached to the housing by a snap-fit connection, the cover enclosing the optical cable connection within the interior of the housing, wherein the housing and the cover are made from a plastic material.

16. The cassette of claim 15, further including an insert piece positioned within the access opening that prevent contaminants from entering the interior of the housing, the insert piece being removable to provide the access to the interior connection end of the fiber optic adapters.

17. The cassette of claim 15, further including an access-evident device that provides evidence of access to the interior of the housing by removal of the cover.

18. The method of assembling a telecommunication fiber optic adapter cassette, the method of assembling comprising:

a) providing a housing defining a front opening;

b) attaching a removable adapter plate to the housing, including:
   i) connecting a first end of the adapter plate to the housing at a hinged connection;
   ii) pivoting the adapter plate about the hinged connection to close the front opening of the housing; and
   iii) snap-fitting the second end of the adapter plate to the housing;

c) mounting fiber optic adapters within openings defined by the adapter plate;

d) mounting a rear multi-fiber connector to the housing;

e) terminating optical cable connections between the fiber optic adapters and the rear multi-fiber connector; and f) enclosing the optical cable connection by snap-fitting a cover to the housing, the cover defining a top opening for providing access to a snap within the housing interior, wherein the housing and the cover are made from a plastic material.

19. A fiber optic adapter cassette, comprising:
a) a housing defining an interior, the housing including:
  i) a front opening;
  ii) a rear wall opposite the front opening, the rear wall defining an aperture;
b) a removable front adapter plate defining an array of adapter openings, the removable front adapter plate being attached to the front opening of the housing by a snap-fit connection; and
c) a cover defining a top opening for providing access to the housing interior, the cover attached to the housing by a snap-fit connection, the cover enclosing the optical cable connection within the interior of the housing, wherein the housing and the cover are made from a plastic material.

20. The cassette of claim 19, wherein the front adapter plate defines a number of angled notches, the openings being located in the angled notches.

21. The cassette of claim 19, wherein the front adapter plate includes mounting flanges each defining a hole, the holes being sized to receive mounting fasteners to mount the cassette to framework structure of a telecommunications system.

22. The cassette of claim 19, wherein the front adapter plate is further attached to the front opening of the housing by a hinged connection.

23. The cassette of claim 22, wherein a first end of the front adapter plate is first attached to the housing by the hinged connection, and a second end of the front adapter plate is then attached to the housing by the snap-fit connection.

24. The cassette of claim 23, wherein the hinged connection includes an opening formed in the front adapter plate that receives a tab provided on the housing, and wherein the snap-fit connection includes a notch formed in the housing that receives a projection provided on the front adapter plate.

25. The cassette of claim 19, wherein an access opening is formed in the housing adjacent to the front opening to provide finger access to the interior of the housing.

26. The cassette of claim 25, further including a removable insert piece positioned within the access opening that prevent contaminants from entering the interior of the housing.

27. The cassette of claim 19, wherein the snap-fit connection between the cover and the housing includes a flexible arm that projects outward from a wall of the housing opposite the cover, and a tab that projects outward from a first side of the cover, the tab engaging with the flexible arm to provide the snap-fit connection between the cover and the housing.

28. The cassette of claim 27, wherein the cover includes a top opening accessible from a second side of the cover opposite the first side, the top opening providing access to the snap-fit connection to remove the cover from the housing.

29. The cassette of claim 28, further including an access-evident device placed over the top opening that provides evidence of access to the interior of the housing by removal of the cover.

30. The cassette of claim 19, further including an access-evident device that provides evidence of access to the interior of the housing by removal of the cover.

* * * * *